United States Patent [19]

Toubol et al.

[11] Patent Number: 5,668,798

[45] Date of Patent: Sep. 16, 1997

[54] MULTIPLEXED TC SUBLAYER FOR ATM SWITCH

[75] Inventors: Gilles Toubol, Villenouve Loubet; Jean Calvignac, La Gaude; Jean-Luc Frenoy; Daniel Orsatti, both of Cagnes sur Mer; Luc Torres, Gattieres; Fabrice Verplanken, La Gaude, all of France

[73] Assignee: International Business Machines Corporation, Armonk, N.Y.

[21] Appl. No.: 547,827

[22] Filed: Oct. 25, 1995

[30] Foreign Application Priority Data

Apr. 5, 1995 [EP] European Pat. Off. ............ 95480041

[51] Int. Cl.⁶ ........................................ H04L 12/56
[52] U.S. Cl. ..................... 370/230; 370/244; 370/395
[58] Field of Search ............................ 370/230, 231, 370/232, 235, 244, 250, 252, 253, 389, 395, 398, 535, 905

[56] References Cited

U.S. PATENT DOCUMENTS

| | | | |
|---|---|---|---|
| 5,119,369 | 6/1992 | Tanabe et al. | 370/60 |
| 5,274,768 | 12/1993 | Traw et al. | 395/200.2 |
| 5,285,442 | 2/1994 | Iwamura et al. | 370/17 |
| 5,287,347 | 2/1994 | Spanke | 370/60 |
| 5,311,509 | 5/1994 | Heddes et al. | 370/60 |
| 5,313,455 | 5/1994 | Van Der Wal et al. | 370/13 |
| 5,386,415 | 1/1995 | Ito et al. | 370/394 |
| 5,555,256 | 9/1996 | Calamvokis | 370/60.1 |

OTHER PUBLICATIONS

European Search Report.

*Primary Examiner*—Alpus H. Hsu
*Attorney, Agent, or Firm*—Gerald R. Woods

[57] ABSTRACT

A data switching device, such as an ATM or Asynchronous Transfer Mode switch, includes a switching fabric with multiple input and output leads. The device also includes at least one input adapter for receiving data cells on each of a number of input ports and at least one output adapter for delivering data cells switched through the switching fabric to a target port in a set of output ports. Error and format checks are performed on incoming cells and counts are kept of the number of good cells and invalid cells received on a particular input port. To reduce hardware costs, the counts are kept in a random access memory which is shared among the input ports. Several storage locations are allocated to each input port to maintain the necessary counts.

4 Claims, 8 Drawing Sheets

MULTIPLEXED TC SUBLAYER FOR ATM SWITCH

CROSS REFERENCE TO RELATED APPLICATIONS

The present invention is related to the below-listed copending applications filed on the same date as this application and commonly assigned to the assignee of this invention: FR9-95-002, Ser. No. 08/547,825, entitled "An Efficient Hardware/Software Interface for a Data Switch", filed 25 Oct. 1995 Ser. No. 08/548,030, entitled "ATM Cell MultiCasting Method and Apparatus", filed 25 Oct. 1995 to Ser. No. 08/547,826, entitled "ATM Cell Fowarding and Label Swapping Method and Apparatus, filed 25 Oct., 1995FR9-95-006.

FIELD OF THE INVENTION

The present invention relates to data communications in general and more particularly to an improved, multiplexed TC (Transmission Convergence) subsystem in an ATM (Asynchronous Transfer Mode) switch.

BACKGROUND OF THE INVENTION

FIG. 1 is a high level block diagram of a typical ATM switch. A switching fabric 100 capable of switching data packets from any to any of its switch input/outs is connected at least to a control unit 151 through leads 111 and 113 and to an adapter 102 through leads 103 and 105. There could be several other adapters, such as adapters 104 and 106, similar or identical to adapter 102. Each adapter is connected to the switching fabric through a pair of input/output leads, such as leads 101. The number of adapters which can be connected to the switching fabric is limited only by the number of available input/output leads.

Control element 151 controls the ATM switch, using a control processor 150, which may be a microprocessor. The control processor is connected to a DMA controller 152, which in turn is connected to a output buffer system 154 and an input buffer system 156. The primary function of the DMA controller 152 is to control the transfer of data between the buffer systems 154 and 156 and the control processor 150. The buffer system 154 is connected an ATM layer processing system 158. The buffer system is similarly connected to a second ATM layer processing system 160. The ATM layer processing systems perform normal ATM layer handling for ATM cells being switched between input and output ports through the switching fabric 100. Control RAMs 162, 164, 166 and 168 are used for storing control programs for the buffer system 154, the ATM layer processing system 158, the buffer system 156 and the ATM layer processing system 160, respectively.

One of the primary functions of adapter 102 is concentration of data received on the various adapter ports before ATM Transmission Convergence (TC) and layer functions are performed. The adapter includes a multiplexer circuit 110 for multiplexing ATM cells received on a set 130 of input ports P1 through P4. To accommodate different media that might be connected to the input ports, individual Physical Media Dependent (PMD) interface chips, such as chip 136, are interposed between the input ports and the multiplexer 110. The adapter further includes a demultiplexer 120 for demultiplexing or distributing ATM cells among ports in a set 131 of output ports. The demultiplexer 120 is connected through a second set of PMD interface chips, such as chip 137) which condition the outgoing data for the particular media attached to the output ports in set 131.

There are commercially available chips that perform the functions of chips 136 and 137. In the case of a 100 Mbps UNI (User-to-Network Interface), these chips can, for example, be Am7968/Am7969 TAXI chips from Advanced Micro Devices Corporation. In the case of a 155 Mbps UNI, these chips can be "framers"from NEC Corporation having a UTOPIA (standard) interface to the multiplexer 110 and demultiplexer 120.

The organization of adapter 102 is similar to the organization of the control element 151. Adapter 102 includes a first buffer system 112 for queueing data to be applied to the switching fabric 100, an associated ATM layer handling processor 116 and control memories 114 and 118 for the systems 112 and 116 respectively. The adapter further includes a second buffer system 122 for queueing data received from the switching fabric, as associated ATM layer handling processor 126 and control memories 124 and 128.

The described implementation of an ATM switch is intended to be illustrative only. Other implementations are possible, such as a system in which the control element and adapters are physically integrated onto the same or a few number of boards. Similarly, the switching fabric might be replaced by a switch or the functions might be allocated differently among the elements.

For further details on ATM concepts and techniques, reference may be had to the below-listed publications:

J. Y. LeBoudec, "The Asynchronous Transfer Mode: A tutorial", Comp Networks ISDN, 24, pp. 279–309, May 15, 1992.

The ATM Forum, "UNI Specification", Version 3.0, Prentice Hall, ISBN 0-13-225863-3, September 1993, and Version 3.1, September 1994.

The ATM Forum, "Interim Inter-Switch Signalling Protocol (IISP)", Draft 94-0924R2, November 1994.

The ATM Forum, "P-NNI Draft Specification", Draft 94-0471 R3, 1994.

In known implementations, the Transmission Convergence functions are performed on a per-port basis; that is, there is a separate set of components for each port on an adapter. Standard Transmission Convergence functions, such as HEC (Header Error Correction) handling and maintenance of network management statistical counts are replicated on a port by port basis. The need for a dedicated set of components for each port clearly adds to the cost of the adapter and occupies physical space (or "real estate") on the adapter that might better be used for other purposes.

The current ATM UNI standard requires large network management statistical counters (thirty-two bits) in order to track the number of good received cells and the number of cells found to be in error after HEC checking. In known systems, two discrete thirty-two bit counters must be provided for each port. Since ATM switches typically have a large number of ports, the requirement for two counters per port adds considerable hardware to the switch.

One possible solution might be to use smaller counters (eight or twelve bit counters, for example) in the hardware elements with a larger counter in microcode supporting the hardware. The drawback of this approach is that performance can be impacted at the system level. To accurately maintain the counts in the microcode based counter, the microcode must read the two hardware counters assigned to each port often enough to avoid the possible of undetected hardware counter overflow. Thus if eight bit hardware counters were used to track good/bad cells, the microcode counter would have to read the hardware counters for each port at least every $2^8$ cell times.

SUMMARY OF THE INVENTION

Reducing the size of the hardware necessary to implement the two thirty-two bit counters per port is a better approach which may be implemented without adversely impacting system performance.

According to the invention the counters are implemented in a shared memory with the help of a Counter RAM Scheduler and a centralized incrementer function implemented in the multiplexer and demultiplexer systems. Instead of a dedicated FIFO per port implementation, the necessary counts are recorded using shared RAM with its associated state machine. Additionally, to minimize the number of cycles required for HEC processing, HEC checking and generation are done eight bits at a time.

BRIEF DESCRIPTION OF THE DRAWINGS

Details of a preferred embodiment of the invention are provided in the following description which should be read in conjunction with the accompanying drawings wherein.

DESCRIPTION OF PREFERRED EMBODIMENT

Figure 1:
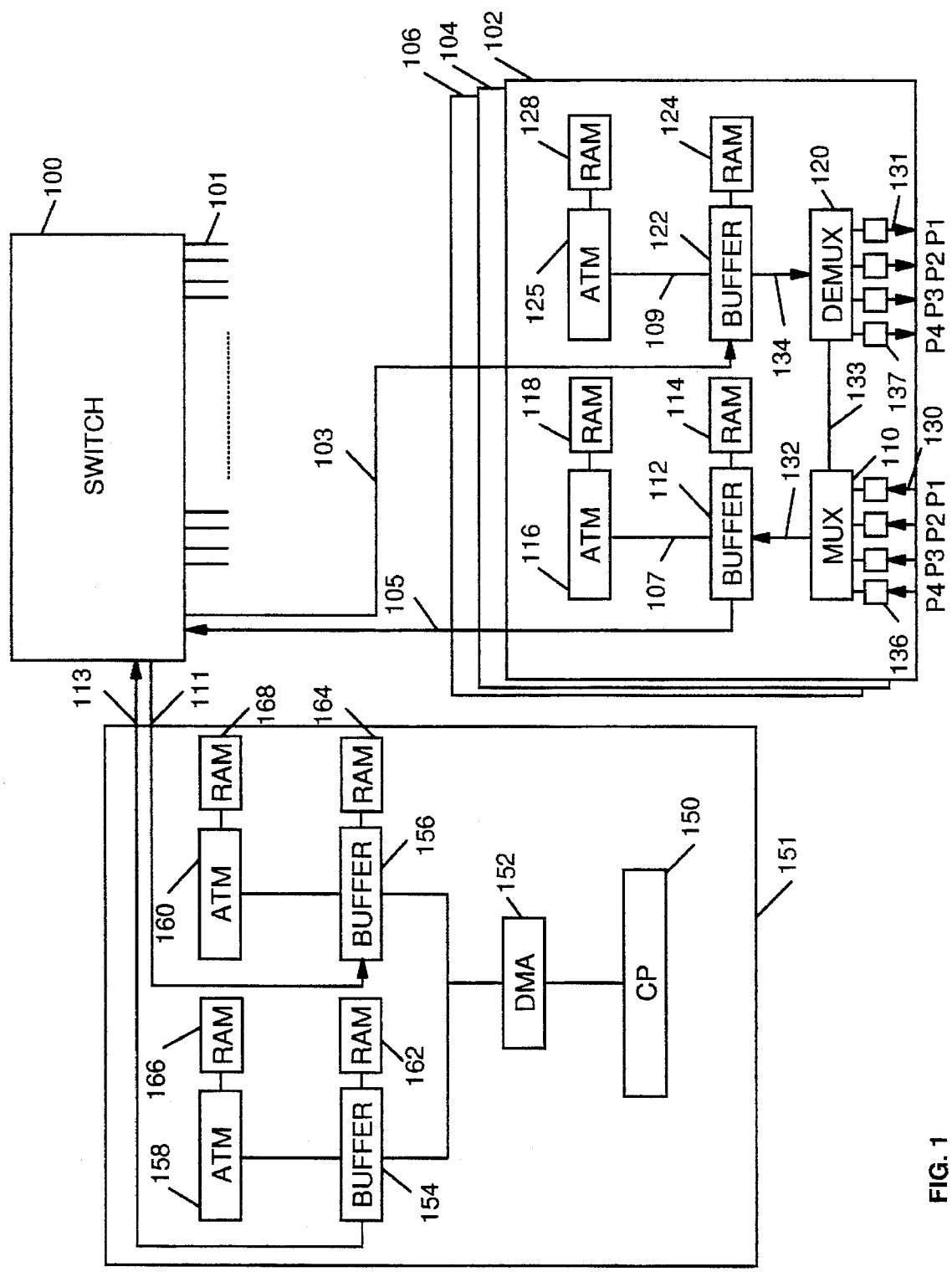
FIG. 1 is a block diagram of an ATM switch showing the environment for the present invention.
Figure 2:
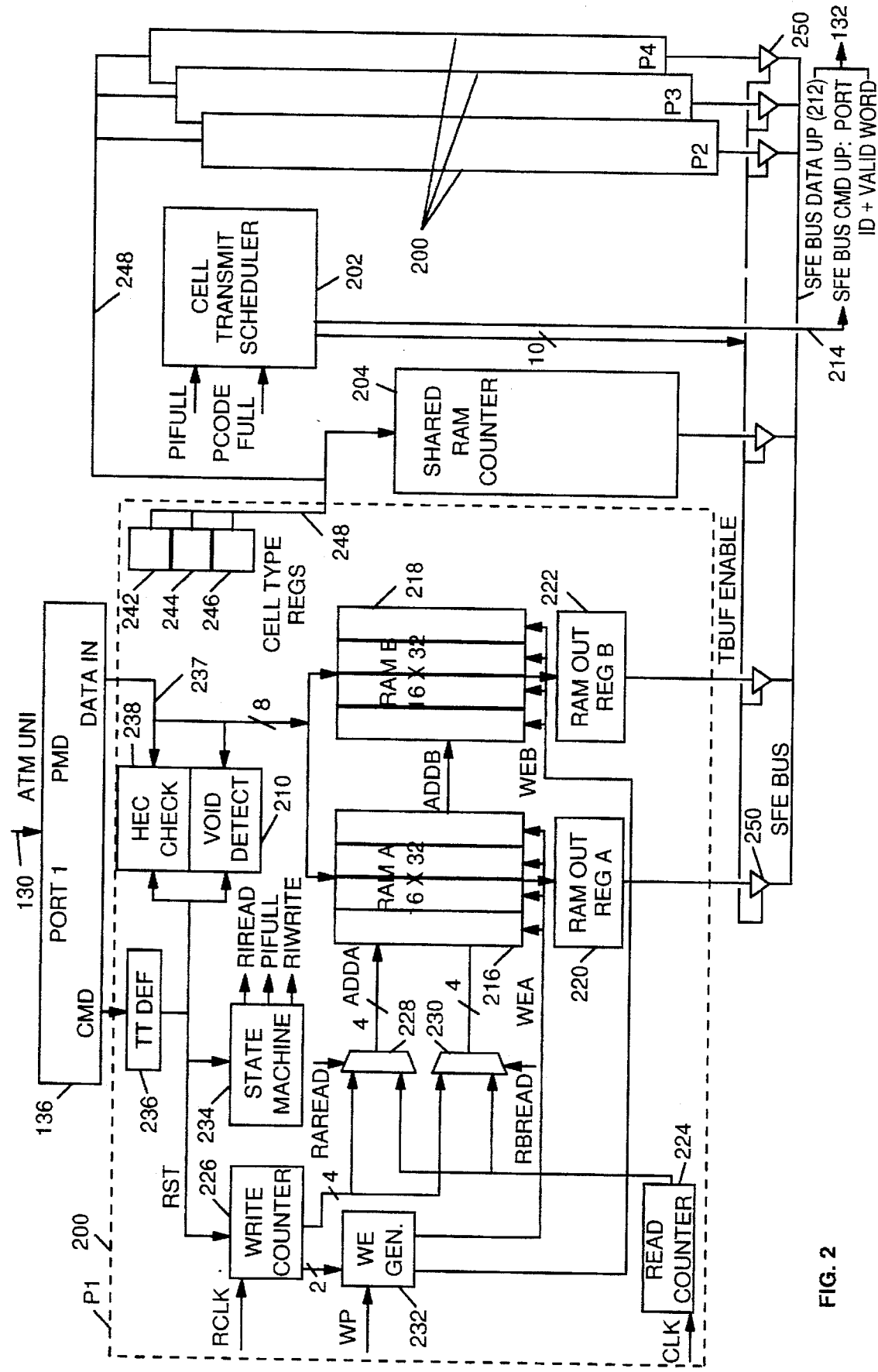
FIG. 2 is an overview of an adapter multiplexer system.

A multiplexer, such as might be used in place of the multiplexer 110, is shown in FIG. 2. To indicate the multiplexer in FIG. 2 is not constructed as known in the prior art, it is designated by reference numeral 110'. The primary functions of multiplexer 110'are: to multiplex data from a plurality of input ports onto the single input bus 132; to count good cells, cells with HEC errors and invalid cells; and to perform HEC checking. The multiplexer 110' is composed of: four physical ATM ports Macros (200); a Cell Transmit Scheduler 202 used to control the actual multiplexing of cell traffic onto the bus 132 and a shared RAM counter 204 used to count ATM cells.

Figure 5:
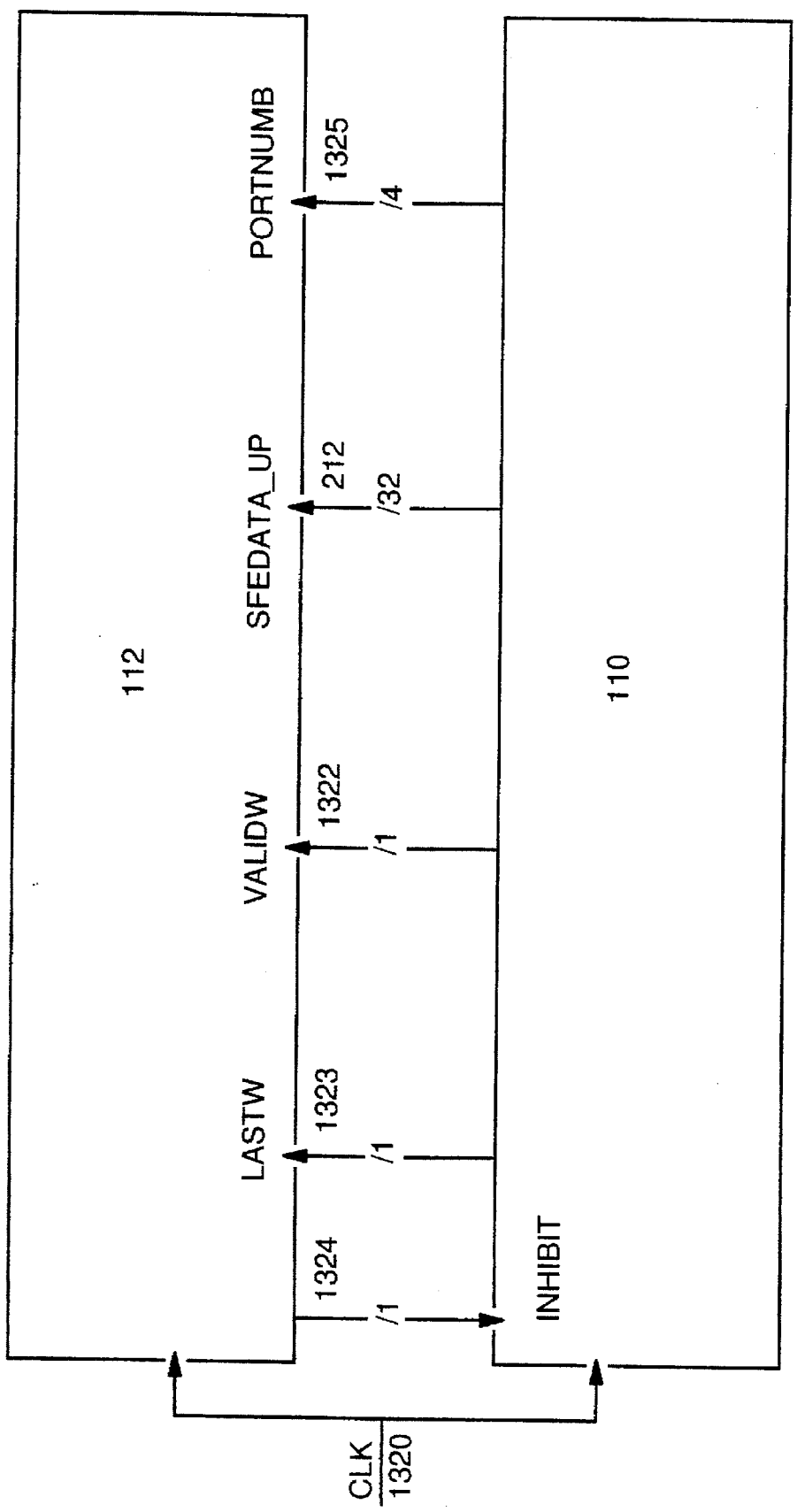
FIG. 5 shows details of an input bus structure.

The data flow can be summarized as follows. ATM cells are received from interface chips, such as chip 136, at media speed. Each cell is delivered with a START OF CELL signal decoded from the TT command. Bad cells (i.e., void cells, cells with HEC errors and invalid cells) are filtered and discarded. Valid cells from all of the ports are multiplexed onto the input bus 132. Upon the arrival of each cell, the appropriate Shared RAM counter 204 is incremented. As shown in FIG. 5, the input bus 132 carries the following signals. CLK 1320 is a clock signal. All signals are synchronized in the middle of two consecutive rising edges of this signal. SFEDATA$_{13}$ UP 212 is the Data Bus up. On the input interface, the signals 212 form the data path from the multiplexer 110' to the buffers 112. VALIDW 1322 is a control bit which validates the contents of the data path. If VALIDW=0, no word is transferred on the data path. If VALIDW=1, a word is transferred on the data path. LASTW 1323 is a control bit that flags the current last data word of the cells. INHIBIT 1324 is a control bit set by the buffer system 112 to indicate that the following cycle must not be used. Finally, PORTNUMB 1325 is a four bit control word that identifies the source port for the current data word.

Referring once again to FIG. 2., the data flow of the physical port Macro 200 is as follows. The multiplexer 110' waits for a TT PMD -start of cell- signal from TT detection device (236). On receipt of the command, multiplexer 110' starts its state machine (234) to receive the fifty-three bytes of the cell coming from the chips 136. The bytes of the cell are stored in either RAM A 216 or RAM B 21 8. When the first four bytes of the cell are stored, the HEC is computed and then checked with the fifth byte on the fly while storing data in RAM at media speed. The HEC byte is not stored in RAM; only the payload bytes are stored. In case of HEC error or invalid cell, the cell is discarded. Void cells, detected by decoding their header, are also discarded. After the fifty-third byte is stored, the RAM A 216 or RAM B218 is declared full which enables the Ram read operation at bus speed. Thirty-two bit words are read and latched in RAM output Reg A 220 or RAM Out-put Reg B 222. Then they are sent as thirty-two bit words to bus system 132 through a multiplexer 250 made of tri state buffers—"Tbufs"— controlled by the cell transmit scheduler 202.

Control of the physical port macro 200 is performed as follows. The two RAMS, 216 and 218 are used as flip-flop cell buffers. Each RAM is organized in 4 'sub rams' of sixteen x eight bits. This structure allows the 52 bytes of an entire cell to be written into one of the RAMs at media speed. At the same time, as data is being written into one RAM, the cell previously stored in the other RAM is read out at bus speed.

Each of the two registers RAM output REG A 220 and RAM output Reg B 222 is composed of thirty-two latches clocked at the bus speed. When a thirty-two bit word is read, it is latched in this register before being sent to the multiplexor 250. The multiplexor 250 is composed of thirty-two Tbufs per RAM enabled when this RAM is in read mode. When the thirty-two Tbufs of a given port are enabled, the thirty-two Tbufs of the other ports are disabled.

The TT detection 236 is designed to implement the "cell delineation function". When the start of cell is detected, the write operation begins. The cell header is checked and compared with the void cell header -00 00 00 01 hexadecimal- by the void cell detector 210. At the end of the reception of a cell, the cell type registers 242, 244, 246 are set to a value that represents the type of the received cell.

000: void cell
001: valid cell
010: HEC error cell
100: invalid cell

The content of these registers is then sent through 248 to the shared RAM counter 204. At the beginning of next cell, the cell type registers 242, 244, 246 are reset.

The HEC checker 238 is described in the following. For each incoming cell, the HEC is calculated on the four first bytes received from DATAIN 237. Then the calculated HEC is compared to the fifth byte of the cell. In all cases, the HEC found in the fifth byte is removed from the cell. The Generator Polynomial is:

$$G(x)=x^{**}8+x2+x+1.$$

Figure 6:
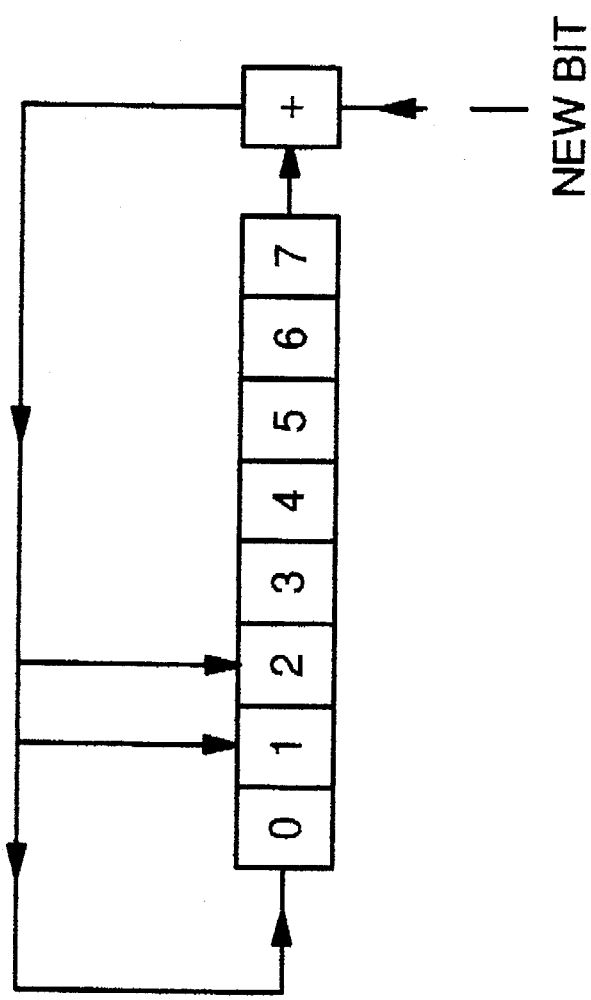
FIG. 6 illustrates a serial HEC calculation.

The serial HEC calculation, as found in the prior art, is shown in FIG. 6. The bit 7 is xored with new bit and the result is re-introduced into the selected exponents of G(x).

The HEC is the remainder of the division -modulo 2- by the polynomial generator G(x).

Figure 7:
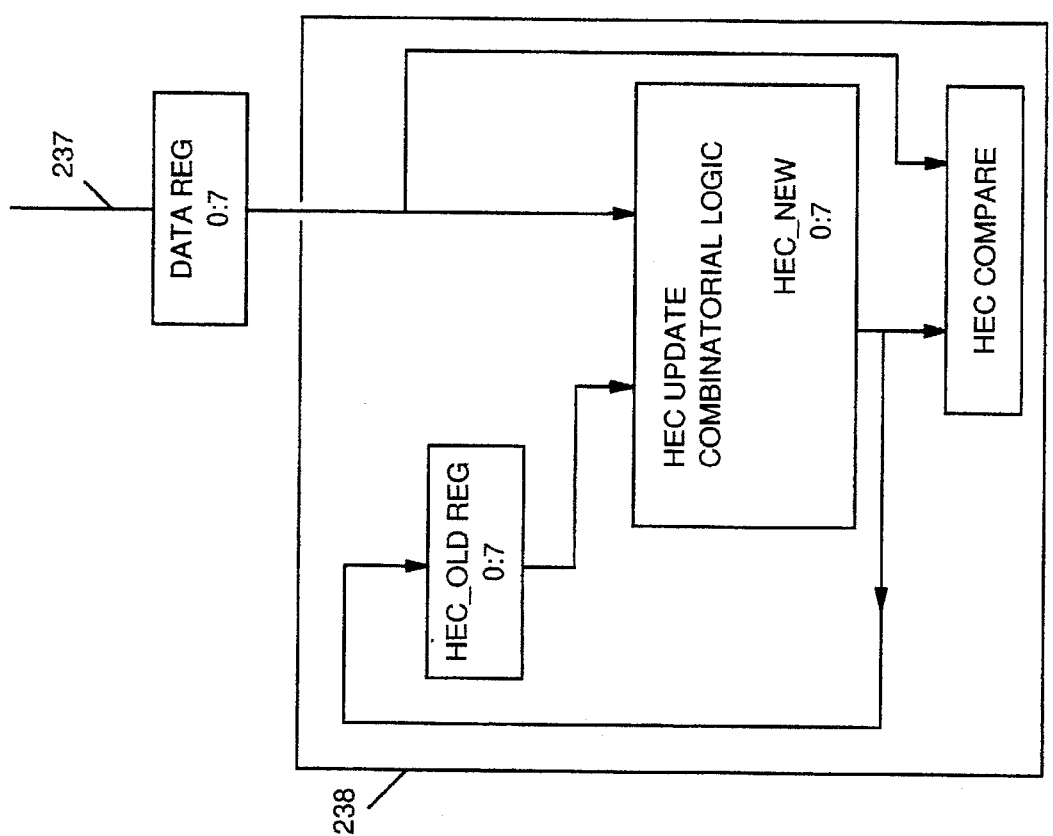
FIG. 7 illustrates a parallel HEC calculation.

According to the invention and in contrast to the prior art, the HEC calculation is done byte per byte in parallel mode, taking into account the position of each byte in the ATM header word as shown in FIG. 7. Basically, as soon as the cell is received, the HEC is accumulated over the function G(x) byte per byte on the ATM header of the incoming cell. Then, it is compared with the fifth received byte of the cell. In this byte oriented implementation, the HEC is accumulated in four clock cycles instead of thirty-two clock cycles in the serial implementation. This parallel implementation is eight times faster and then reduces the requirement on the cycle execution time.

The HEC update combinatorial logic is based on a XOR matrix whose equations are defined as follows:

$$Hec\_new(0)=Hec\_old(0) \text{ XOR } Hec\_old(1) \text{ XOR } Hec\_old(2) \text{ XOR } Data(0)$$

$$Hec\_new(1)=Hec\_old(2) \text{ XOR } Hec\_old(1) \text{ XOR } Hec\_old(3) \text{ XOR } Data(1)$$

$$Hec\_new(2)=Hec\_old(4) \text{ XOR } Hec\_old(3) \text{ XOR } Hec\_old(2) \text{ XOR } Data(2)$$

$$Hec\_new(3)=Hec\_old(5) \text{ XOR } Hec\_old(4) \text{ XOR } Hec\_old(3) \text{ XOR } Data(3)$$

$$Hec\_new(4)=Hec\_old(6) \text{ XOR } Hec\_old(5) \text{ XOR } Hec\_old(4) \text{ XOR } Data(4)$$

$$Hec\_new(5)=Hec\_old(7) \text{ XOR } Hec\_old(6) \text{ XOR } Hec\_old(5) \text{ XOR } Data(5)$$

$$Hec\_new(6)=Hec\_old(1) \text{ XOR } Hec\_old(7) \text{ XOR } Hec\_old(6) \text{ XOR } Data(6)$$

$$Hec\_new(7)=Hec\_old(1) \text{ XOR } Hec\_old(0) \text{ XOR } Hec\_old(7) \text{ XOR } Data(7)$$

Referring again to FIG. 2, the state machine 234 controls the toggling between RAM A 216 and RAM B 218, and generates the signal PnFULL that will be used by cell transmit scheduler 202 to multiplex and transmit cells to input bus system 132. This state machine is restarted at each TT detection.

The write counter 226 is incremented at each valid byte received from Chips 136. The four most significant bits are used to generate the Write RAM Addresses. The two least significant bits are used to generate the byte write enable signals. This allows four consecutively received bytes to be stored as a thirty-two bit word in RAM.

The read counter 224 generates the read RAM addresses used to fetch words to be put on input bus 132.

The RAM address selectors 228 and 230, according to their inputs (RARead, RBRead), select the read counter or the write counter as RAM address provider.

The write enable generator 232 is used to generate the write enable signals to the RAMs, This generation is done at each valid byte received from the chips 136.

The cell transmit scheduler 202 is in charge of generating all the internal control signals and the SFE bus command signals 214, that allow multiplexing of traffic on the four input ports to the bus 132.

Figure 3:
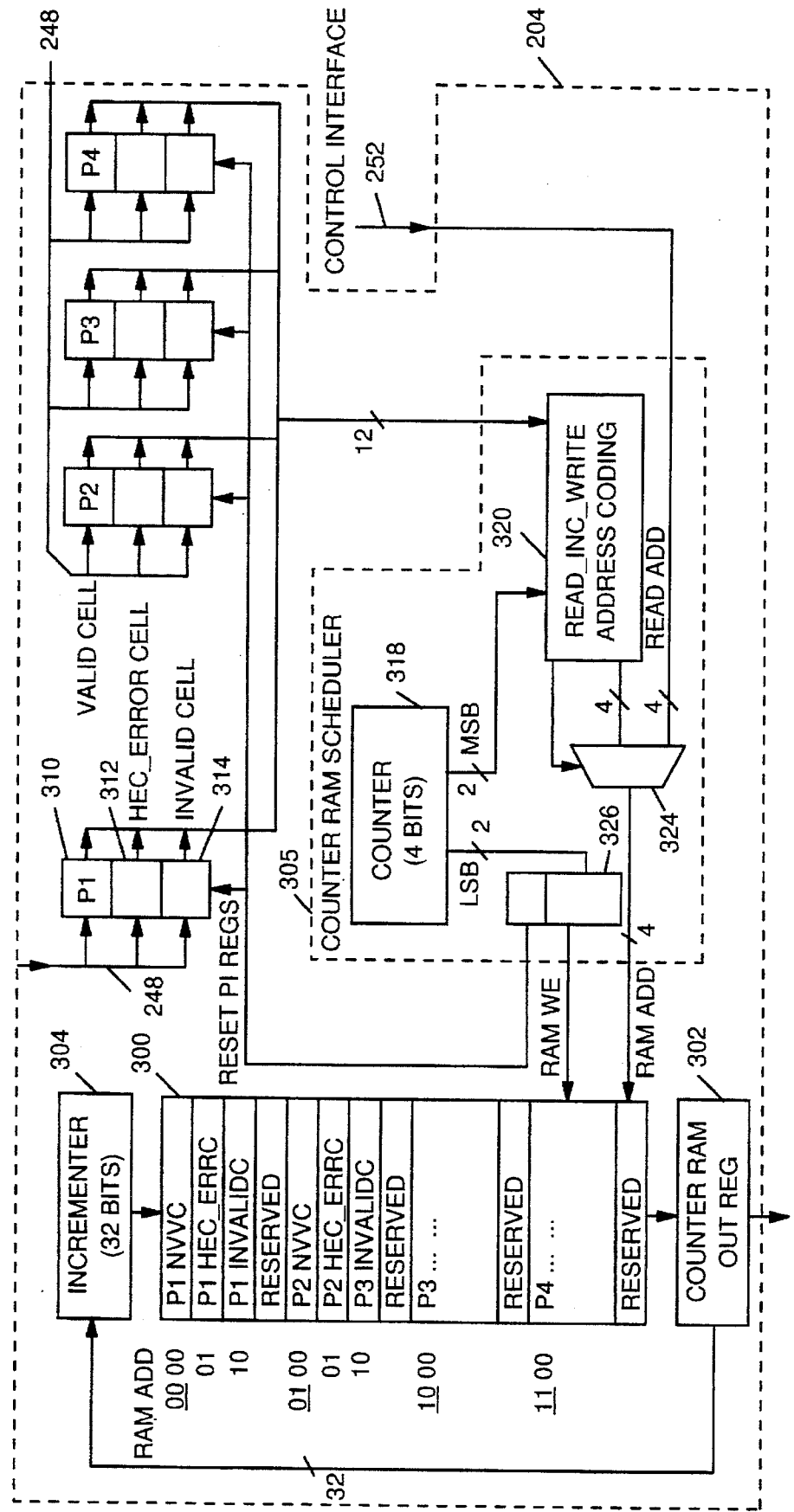
FIG. 3 shows a shared RAM counter used in the multiplexer system.

The following description details the shared RAM counter 204, shown in FIG. 3. One function of counter 204 consists of counting cells. For each port, the following cells are counted: valid cells (NVVC in 300); HEC error cells (HEC_ERRC in 300); and invalid cells (INVALIDC in 300) corresponding either to PMD code violation cells or to cells of improper length.

The shared RAM counter 204 is composed of: A sixteen x thirty-two RAM 300 used to store the counter values; thirty-two bit counter RAM output Reg 302: one thirty-two bit incrementer 304 common to all counters; a RAM scheduler 305 used to control the RAM sharing between all ports; and four 3 bit registers 310, 312, 314 to indicate to the shared RAM which counter has to be incremented.

The shared RAM counter 204 provides two functional modes: counter increment, which consists of a read operation, an increment current counter value operation and finally write the new value at the same address; and counter read. The counter contents can be read by the control interface 252 to communicate with the control_processor 150. In this case the address is given by control interface 252 and the result is plac.ed on the input bus 132 through the multiplexor 250. The sixteen x thirty-two organization of the RAM counter 300 provides up to sixteen thirty-two bit counters. In one embodiment of the invention, only twelve counters are used.

Addresses coded on four bits are as follows: The two most significant bits represent the port number (P1: 00, P2: 01, etc ... ). The two least significant bits represent the counter type (NVVC: 00, HEC_ERRC: 01, INVALIDC: 10). This minimizes the encoding logic implemented in Read_INC_WRITE ADDRESS CODING 320. The counter RAM output Reg 302 latches the read thirty-two bit word and is disabled during write operation to avoid a disruptive loop.

The counter RAM scheduler 305 implements all the logic used to control the sharing of the RAM among the four ports, and the two kinds of operation (read-increment-write, or simple read). Scheduler 305 is composed of: a four bit counter 318 which is used to generate the four different utilization dedicated time slots (one per port), and to generate the write enable signal (when a time slot is used to perform a read-Increment-write operation); and a read-increment_write address coder 320 whose inputs are the four 3 bit registers 310, 312, 314 that indicate which kind of counter will be incremented, and the two most significant bits of the counter 318. Its outputs are the read-increment-write RAM address, and the signal that permits to select the previous address in the address selector 324. Scheduler 305 also includes the write enable generator 326, which receives the two least significant bits of the counter 318, and is used to generate the RAM write enable signal and the reset Pi regs signal used to reset the registers 310, 312, 314 at the end of a read-increment-write Cycle.

The PiREGs 310, 312, 314 consist of 3 registers per port. They contain the information identifying which counter must be incremented after a cell has been received at chips 136. These registers are used to generate the two least significant bits of the read-increment-write address. After incrementing a counter for port n, the PiREGs 310, 312, 314 for port n are reset. The control interface 252 is used to communicate with control_processor 150. It accesses the shared RAM in read operations.

Figure 4:
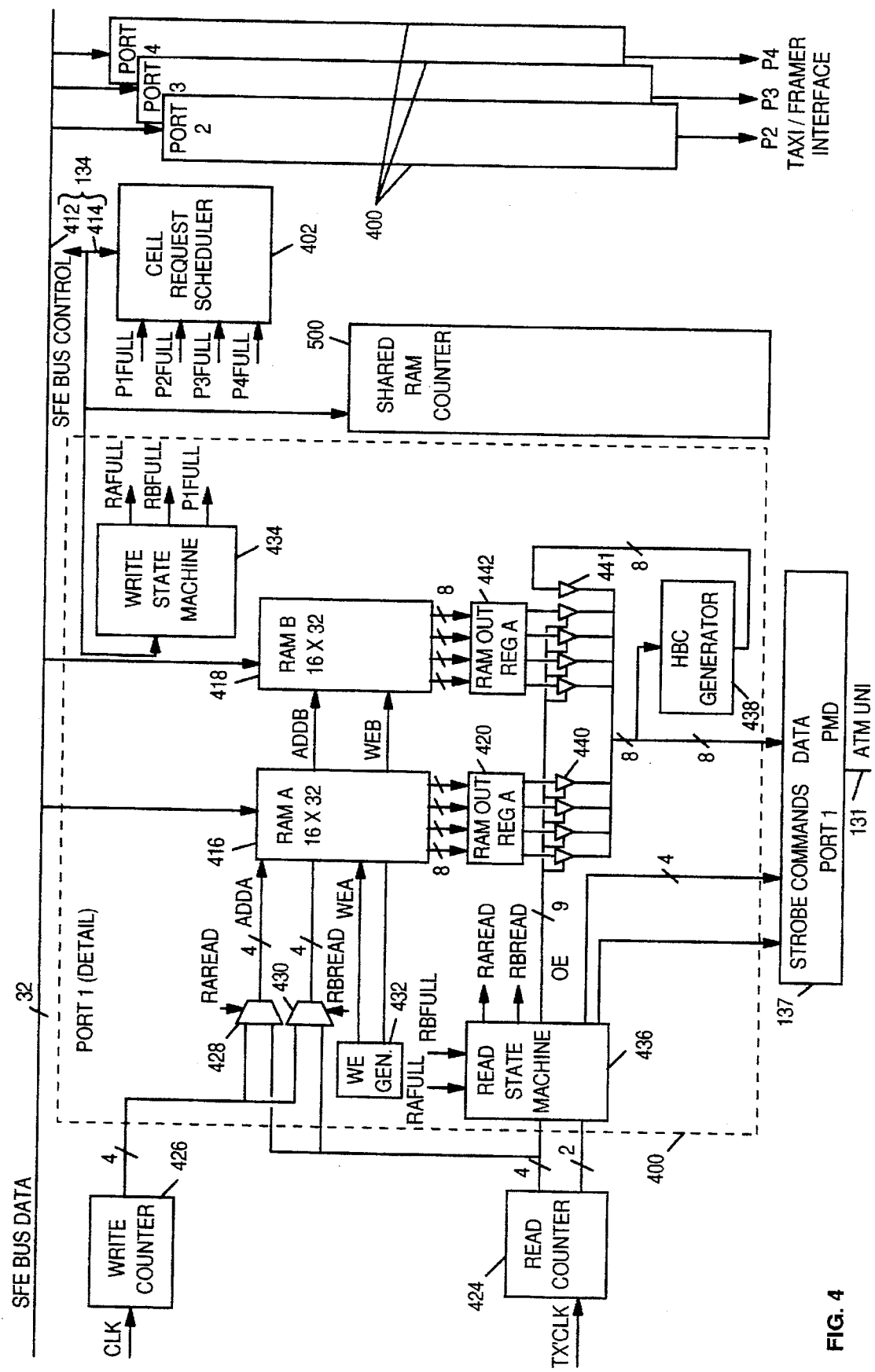
FIG. 4 is an overview of an adapter demultiplexer system.

The adapter demultiplexer 120 is described with reference to FIG. 4 for one embodiment of the invention. The primary functions of demultiplexer 120 include: demultiplexing of cells intended for a plurality of output ports from the output bus 134; Counting of transmitted ATM cells; and HEC generation. Demultiplexer 120 is composed of: four physical 100 Mbps ATM port macros 400; the cell request scheduler 402 used to control multiplexed cell traffic received on output bus 134; and the shared RAM counter 500 used to count transmitted ATM cells.

The data flow can be summarized as follows: ATM cells are received on adapter output bus 134 upon request of the demultiplexer 120. Each cell is delivered with its port number PNUMB 4143 and VALID bit 4142 attached. After the port number is decoded by the write state machine 434, the cell is sent to corresponding physical port. The cell is fully stored in either RAM A 416 or RAM B 418 and then is transmitted to one of the chips 137. The HEC byte is calculated on the fly and inserted at the end of the ATM header. At the same time, the 'shared RAM counter' 500 is incremented.

Figure 8:
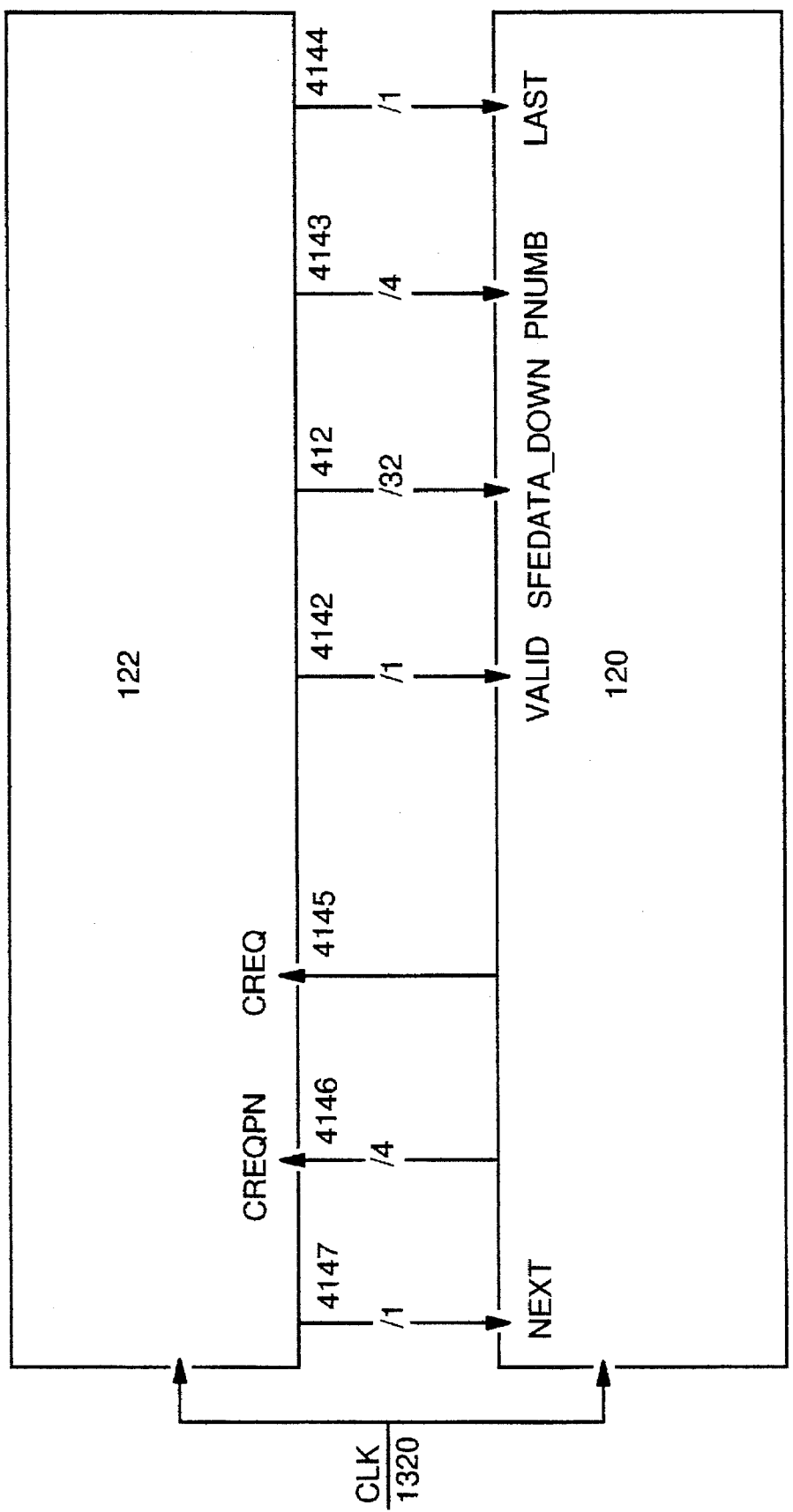
FIG. 8 shows an output bus structure.

As shown in FIG. 8 output bus 134 uses the following signals. SFEDATA_DOWN 12 is the Data Bus down. On the output interface these signals form the data path of the transmit side buffer system 122 to demultiplexer 120. VALID 4142 is a control bit which validates the contents of the data path buffer system 122 to demultiplexer 120. If the bit is 0; no word is transferred on the data path. If the bit is 1; a word is transferred on the data path. PNUMB 4143 is the data port number; four control bits which indicate the target port for the current data word. LAST 4144 is a control bit which flags the last data word of the current cell. CREQ 4145 is the cell request; a control bit which indicates that a cell is to be transferred to demultiplexer 120 from output buffer system 122. CREQPN 4146 is the cell request port number; four control bits which identify the target port. NEXT 4147 is the next cell request allowed. The demultiplexer 122 enables the output buffer system 120 to run its request scheduler for next cell request selection.

Referring back to FIG. 4, the data flow of the physical port macro 400 is described below. The cell request scheduler 402 requests a cell for a given port according to the state of RAMs 416 or 418. The cell moves from output buffer 122 across the output bus 134, one thirty-two bit word every cycle. The words are stored in one of the two RAMs 416 or 418. After the thirteenth word is stored, the RAM is full which enables the RAM read operation at output media speed. Thirty-two bit words are read and latched in RAM Output Reg A 420 or RAM Output Reg B 422. Then each word is sent, byte by byte, to the chips 137 using a byte selector 440 controlled by the read state machine 436.

During the transmission of the 4 first bytes, the HEC is calculated and is transmitted at the fifth byte position. The two RAMs, RAM A 416 and RAM B 418, are used as flip-flop cell buffer. Each RAM comprises sixteen thirty-two bit storage locations. This arrangement allows the thirteen thirty-two bit words of an entire cell to be written into one RAM while the cell previously stored in the other RAM is read at media speed. Each of the two registers 420 and 422 is composed of thirty-two latches clocked at media speed. When a thirty-two bit word is read it is latched in this register before being sent byte per byte to the target port.

Byte multiplexer 440 is composed of two sets of four x eight bit =thirty-two TBufs. For each of the registers 420 and 422, thirty-two TBufs organized in four groups of eight, are used to select one byte out of four. This structure allows to feed the TAXI interface by bytes. The HE(3 byte insertion is done by the HEC multiplexer 441, made of eight TBufs. All the seventy-two Tbufs (two×thirty-two+eight) are controlled by the Read state machine 436. For each cell, the HEC is calculated in parallel (byte by byte) by the HEC generator 438. This calculation is performed at media speed while the corresponding bytes are sent to the target chip 137. Then the accumulated HEC is given to the HEC multiplexer 441, in order to be transmitted in the 5th byte position to the target chip 137.

The read state machine 436 is used to deliver output cells to chips 137. To do so, machine 436 performs the switching from write to read of the RAMs according to the inputs RAFULL and RBFULL, controls the address RAM selector, enables the output enable signals of multiplexers 440 and 441, generates the start of cell signal (TT command), and resets the HEC generator 438. After having decoded the number of the port to which it belongs, the write state machine 434 controls the toggling between RAM A 416 and RAM B 418; that is, which of the RAMs will be written or read at each cell, generates the signals RAFULL and RBFULL that will be used by the Read state machine to switch to read mode, and generates the signals PnFULL that will be used by cell request scheduler 402 to perform cell requests from buffer 122.

The RAM address selectors 428 and 430, according to their inputs RARead and RBRead, select the read counter or the write counter as RAM address providers. The write enable generator 432 is used to generate the write enable signals to the RAMs. This generation is done for each valid word received from output bus 134.

Logic common to all the ports is detailed as follows. The cell request scheduler 402 is in charge of generating cell requests to output buffer 122 for all ports according to the state of their RAMs. The write counter 426 is used to generate write RAM addresses. It is incremented at each valid word received from output bus 134. The read counter 424 is a free running counter used to select the appropriate data bytes to be sent to the target ports. To do so, the 4 most significant bits are used to generate read RAM addresses. The 2 least significant bits are used by the read state machine 436 to generate output enable signals for the multiplexers 440 and 441.

What is claimed is:

1. A data cell switching device comprising:
   a) a switching element, having multiple input leads and multiple output leads, for switching data cells received on any one of said multiple input leads to any one of said mulitiple output leads;
   b) one or more output adapters, each connected to said switching element through one of the multiple output leads and each having an output internal bus, and each having mulitiple output ports and demultiplexer device for distributing data cells transported on the output internal bus to one of said multiple output ports; and
   c) one or more input adapters, each connected to said switching element through one of said multiple input leads and each having an input internal bus, and each having multiple input ports, a multiplexer device for multiplexing data cells received from said multiple inputs ports onto said input internal bus, and wherein each of said input adapters and said output adapters includes a respective common counter for maintaining counts based on the properties of cells recevied on said input ports, said common counter comprising a random access memory having at least three storage location reserved for each of said input ports.

2. A data cell switching device as set forth in claim 1 wherein each of the reserved storage locations contains at least thirty-two bits of storage.

3. A data cell switching device as set forth in claim 1 or claim 2 wherein a first of said three storage locations is used to maintain a count of valid cells received at the associated input port while the remaining two storage locations are used to maintain counts for cells for which predetermined types of errors are detected.

4. A data cell switching device as set forth in claim 3 wherein each of said input and said output adapters further includes:
   a) first and second buffer memories, each connected to said internal bus and to the multiple input or output ports; and
   b) control logic for causing a data cell to be loaded into one of said buffer memories concurrently with the transfer to said demultiplexer device of a data cell previously loaded into the other of said buffer memories.

* * * * *